April 30, 1957 E. E. HERMAN ET AL 2,790,929

DIRECT-VIEWING HALF-TONE STORAGE DEVICE

Filed Sept. 30, 1954 3 Sheets-Sheet 1

INVENTORS.
GEORGE F. SMITH,
ELVIN E. HERMAN,
BY
Henry Heyman
ATTORNEY.

DIRECT-VIEWING HALF-TONE STORAGE DEVICE

Filed Sept. 30, 1954 3 Sheets-Sheet 2

INVENTORS.
GEORGE F. SMITH,
ELVIN E. HERMAN,
BY
Henry Hyman
ATTORNEY.

DIRECT-VIEWING HALF-TONE STORAGE DEVICE

INVENTORS.
GEORGE F. SMITH,
ELVIN E. HERMAN,
BY
Henry Heyman
ATTORNEY.

United States Patent Office 2,790,929

Patented Apr. 30, 1957

2,790,929

DIRECT-VIEWING HALF-TONE STORAGE DEVICE

Elvin E. Herman, Pacific Palisades, and George F. Smith, Los Angeles, Calif., assignors to Hughes Aircraft Company, Culver City, Calif., a corporation of Delaware Application September 30, 1954, Serial No. 459,403

11 Claims. (Cl. 315—12)

This invention relates to electronic storage devices and more particularly to a direct-viewing storage tube capable of presenting half-tones for controlled intervals of time and over an expanded range of operation.

A conventional direct-viewing half-tone storage tube comprises a foraminous storage screen arranged to be scanned by a high energy electron beam of elemental cross sectional area. A collector grid is disposed coextensive with and spaced from the storage screen so that the scanning beam may be employed to produce a charge pattern on the storage surface of the storage screen. In operation the charge pattern on the storage screen controls the flow of flood electrons passing through the storage screen to a viewing screen to produce a visual presentation of the charge pattern. During a major portion of each operating cycle, the potentials constituting the charge pattern are maintained negative with respect to the potential of the source of the flood electrons so that the charge pattern is not prematurely erased. Erasing of the charge pattern during each operating cycle is effected by periodically pulsing the storage screen positive by an amount equal to the range of half-tone operation, i. e., the voltage range over which the flood electron current through the interstices within an elemental area of the storage screen is approximately proportional to the charge thereon.

In order to obtain optimum half-tone operation of the conventional storage device, it is necessary to restrict the charge pattern to the range of storage screen potentials wherein half-tones are obtained. In that this range is normally only a few volts, it is evident that half-tone operation is extremely critical and in the case of larger tubes, impracticable. The basic difficulty is caused by the control of the flow of flood electrons by the charge on the storage surface. Proper control necessitates that the flood electrons be collimated over the entire area of the storage surface; for example, any deviation from normal incidence greatly decreases the number of flood electrons able to penetrate through the storage screen for a given charge thereon. One manner in which the half-tone range may be increased is, of course, to increase the size of the interstices in the storage screen so that charges on the storage surface exert less control over the flow of flood electrons. This alternative, however, results in a sacrifice of resolution, which is highly undesirable.

The direct-viewing half-tone storage device of the present invention has substantially none of the aforementioned disadvantages of the prior art device. The disclosed device incorporates a storage screen providing an expanded half-tone range of operation which is accomplished with substantially no loss in resolution. This storage screen preferably comprises a metallic screen, on one side of which is evaporated a relatively thin layer of secondary electron emissive dielectric material to provide a storage surface. In actual contact with this storage surface, there is disposed an additional highly transparent conductive screen having a thickness of the same order of magnitude as that of the layer of dielectric material. In operation this additional conductive screen is maintained at a potential that is equal to or slightly positive with respect to the potential of the storage screen so as to neutralize to a large extent the electrostatic fields within the interstices of the storage screen produced by charges on the storage surface. In this manner, the half-tone range of operation of the storage screen is considerably increased.

In view of the fact that the additional conductive screen may be operated at a potential equal to that of the storage screen, it is evident that an alternative embodiment of the storage screen incorporated in the storage device of the present invention comprises a metallic screen with patches of dielectric material dispersed uniformly over one side so as to cover only isolated portions of the surface of the screen. A storage screen of this type is less versatile but advantageous from the standpoint of being easy to manufacture.

In addition to having an expanded half-tone range of operation, the device of the present invention includes apparatus to control the rate at which half-tone charges of varying magnitudes on the storage screen are discharged thereby controlling the relative persistence of the half-tones. This apparatus comprises means for providing a sequence of pulses which include voltage components extending over a range of potentials equivalent to the range of potentials over which half-tone operation is achieved. In accordance with the present invention, the relative rate of discharge by means of flood electrons of a half-tone charge is determined by having a portion of the discharge pulses constituted of predetermined voltage components that are less positive than the peak potential of the pulses.

It is therefore an object of this invention to provide a direct-viewing storage device incorporating a storage screen providing an expanded half-tone range of operation.

Another object of this invention is to provide a direct-viewing half-tone storage device including apparatus for partially neutralizing the effect of charges on a storage screen thereby expanding its half-tone range of operation.

A further object of this invention is to provide a direct-viewing storage device capable of presenting half-tones of controlled persistence.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
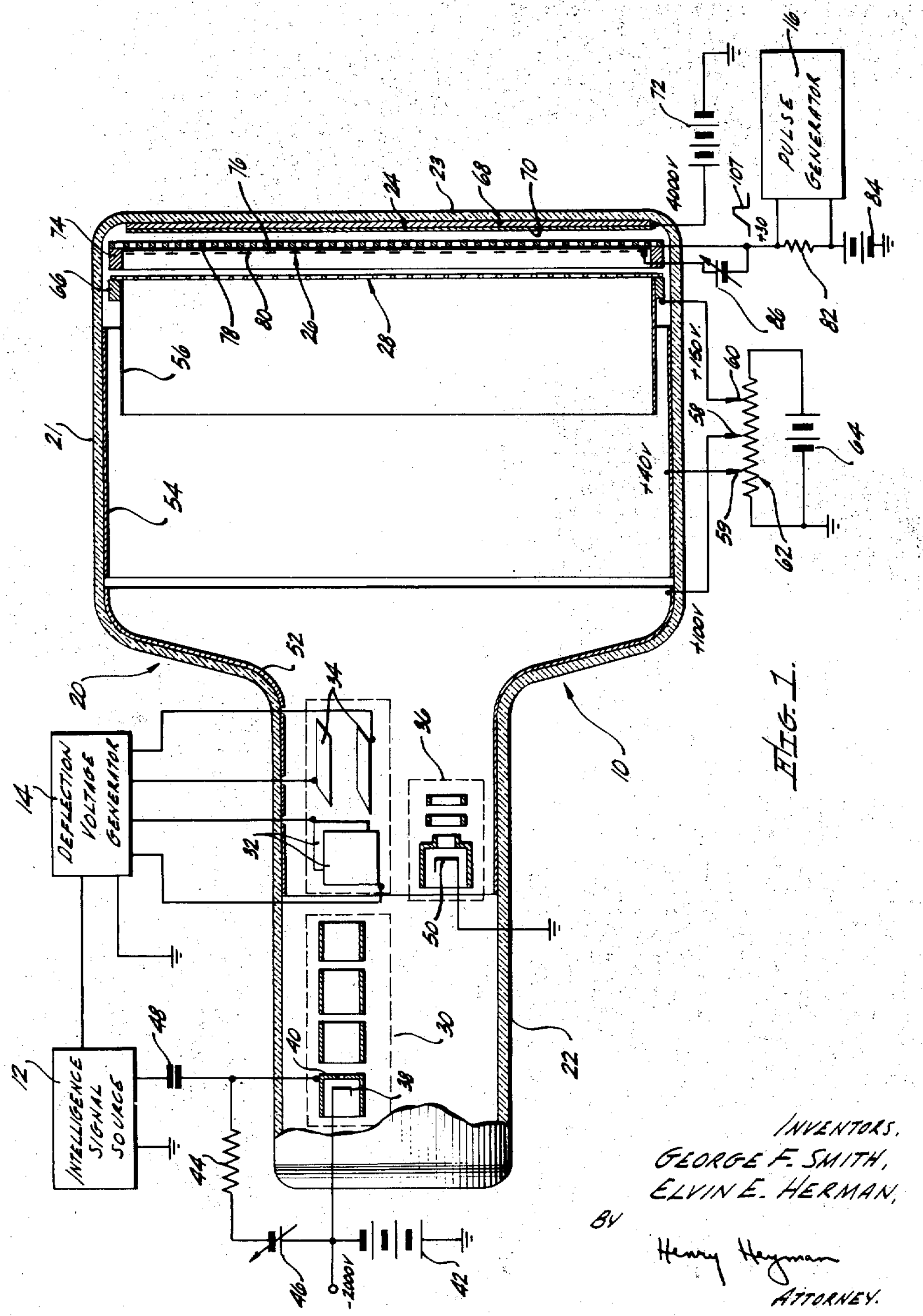
Fig. 1 is a schematic diagram of the direct-viewing half-tone storage device of the present invention and associated electric circuits.

Referring now to the drawings, Fig. 1 illustrates an embodiment of the storage device of the present invention comprising a direct-viewing storage tube 10 which operates in conjunction with an intelligence signal source 12, a deflection voltage generator 14, and a pulse generator 16. Storage tube 10 includes an evacuated envelope 20 which consists of an enlarged cylindrical portion 21 having a neck portion 22 at its left extremity and a flat end transparent portion 23 at its right extremity, as shown in the drawing. Commencing from the flat end portion 23 and coextensive therewith there is disposed a viewing screen 24, a storage screen 26, and a collector grid 28. An electron gun 30 for producing an electron beam of elemental cross sectional area, horizontal and vertical deflecting plates 32 and 34, respectively, for directing the electron beam towards selected elemental areas of storage screen 26, and a flood gun 36 for producing a broad beam of electrons directed towards storage screen 26 are disposed in the neck portion 22 of envelope 20.

More particularly, electron gun 30 includes a cathode 38 and an intensity grid 40, the purpose of grid 40 being to control the intensity of the electron beam. Cathode 38 is maintained at a potential of the order of −2000 volts negative with respect to ground by means of a connection to the negative terminal of a battery 42, the positive terminal of which is connected to ground. Intensity grid 40 is maintained at an adjustable quiescent potential of the order of −50 volts negative with respect to the potential of cathode 38. This is accomplished by means of a connection from intensity grid 40 through a resistor 44 to the negative terminal of a variable potential source 46 and a connection from the positive terminal of source 46 to cathode 38. The electron beam produced by electron gun 30 is modulated in accordance with an intelligence signal by a connection from intelligence signal source 12 through a capacitor 48 to the intensity grid 40.

Deflection voltage generator 14 develops horizontal and vertical deflection voltages which are synchronized with the intelligence signal through a connection to signal source 12. The horizontal and vertical deflection voltages are impressed, respectively, on horizontal and vertical deflection plates 32, 34 by means of appropriate connections thereto.

The flood gun 36, as previously specified, develops a broad beam of electrons which is directed towards the storage screen 26. These flood electrons emanate from a cathode 50 which is grounded. In the operation of the device of the present invention, it is desirable that the flood electrons arrive at the storage screen 26 at approximately normal incidence. Collimation of the flood electrons is effected by means of a collimating lens produced by lens cylinders 52, 54 and 56. Lens cylinders 52 and 54 are disposed in succession concentrically about the inner surface of envelope 20 from the electron gun 30 to the collector grid 28. Lens cylinders 52, 54 are conductive coatings which may be provided, for example, by painting a colloidal suspension of graphite commonly known as "Aquadag" on the glass. These lens cylinders 52, 54 are maintained at potentials of the order of 100 volts and 40 volts, respectively, by connections to taps 58, 59 of a potentiometer 62 which is, in turn, connected across a battery 64, the negative terminal of which is connected to ground.

Lens cylinder 56, on the other hand, is attached to the inner periphery of a ring 66 which also serves to support the collector grid 28. Lens cylinder 56 extends from the ring 66 towards the flood gun 36 and overlaps the right extremity of lens cylinder 54, as viewed in the drawing. Both lens cylinder 56 and collector grid 28 are maintained at a potential of the order of 150 volts positive with respect to ground by means of a connection to a tap 60 of potentiometer 62.

The viewing screen 24 comprises a transparent conductive coating 68 and a phosphor coating 70 disposed in the order named on the inner surface of the flat transparent end portion 23 of envelope 20. Conductive coating 68 may be provided, for example, by a thin layer of stannous oxide, commonly known as "Nesa," on the glass envelope. This conductive coating 68 is maintained at a potential of the order of 4000 volts positive with respect to ground by a connection to the positive terminal of a battery 72, its negative terminal being connected to ground.

Figure 2:
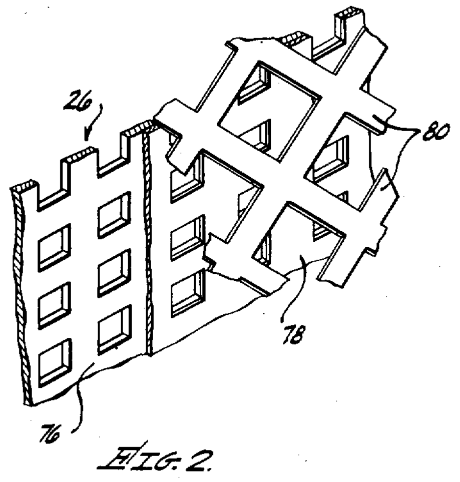
Figs. 2 and 3 are views on enlarged scale of portions of alternative embodiments of the storage screen of the device of Fig. 1.

The storage screen 26 is supported by a ring 74 intermediate the collector grid 28 and viewing screen 24 and is coextensive therewith. Storage screen 26, an enlarged portion of which is shown in Fig. 2, includes an electro-formed nickel screen 76 having of the order of 250 meshes per inch and a thickness of the order of 0.001 inch. The actual number of meshes and thickness of the screen are not critical and may be chosen from a considerable range of values. The respective values of 250 and .001 inch are given for guidance but it is understood that these are convenient but not limiting values. The outer periphery of this screen is welded to the ring 74. A storage surface is provided on the side of nickel screen 76 facing the neck portion 22 of envelope 20 by a thin layer 78 of secondary electron emissive dielectric material. Layer 78 preferably does not overhang or extend over the interstices of nickel screen 76 and has a uniform thickness which is preferably of the order of 20,000 Angstroms but may be as thick as 50,000 Angstroms. Layers of this type may be provided, for example, by evaporating magnesium fluoride on the appropriate side of nickel screen 76. An additional conductive "neutralizing" screen 80 having of the order of 170 meshes per inch and a thickness of the order of 0.0003 inch is then disposed in actual contact with the storage surface provided by layer 78 to partially neutralize the effect of the charge thereon during operation of the device. The meshes of conductive screen 80 are preferably disposed at an acute angle with the meshes of nickel screen 76 so as to minimize moire effect. A method of making conductive screen 80 and of placing it on this storage surface is described in a copending application for patent, Serial No. 409,240 entitled, "Direct-Viewing Storage Tube," filed by Henry Millard Smith on February 9, 1954.

In operation the nickel screen 76 is maintained at a quiescent potential of the order of +30 volts with respect to ground by means of a connection through a resistor 82 to the positive terminal of a battery 84, which, in turn, has its negative terminal connected to ground. The additional screen 80 is maintained at a potential of from 0 to 10 volts positive with respect to the potential of nickel screen 76. This is accomplished by means of a variable potential source connected between screens 76 and 80. Pulse generator 16 is connected across resistor 82 to periodically pulse the potential of storage screen 26 positive in a predetermined manner which will be described in more detail later.

Figure 3:
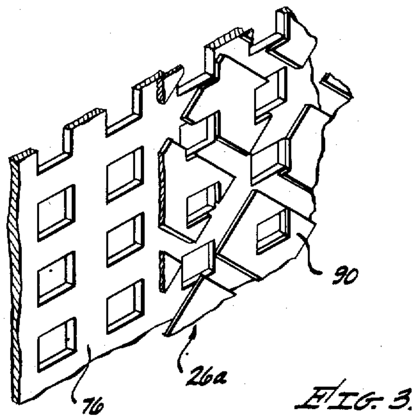

In that neutralizing screen 80 may be operated at the same potential as that of nickel screen 76, it is possible to combine these screens into one composite screen to make a storage screen 26*a*, an enlarged portion of which is shown in Fig. 3. Storage screen 26*a* comprises the nickel screen 76 forming an element of storage screen 26*a*. Its storage surface, however, is provided by a layer 90 of magnesium fluoride partially covering each elemental area on one side of nickel screen 76. In this manner, the exposed portion of nickel screen 76 serves the same purpose as the neutralizing screen 80 of storage screen 26 when operated at zero potential difference. The layer of magnesium fluoride is, as before, of a uniform thickness of the order of 20,000 Angstroms. Storage screen 26*a* may be made, for example, by evaporating the magnesium fluoride layer 90 on the nickel screen 76 through a mask provided by a thin foraminous sheet of metal or a screen having from 100 to 400 meshes per inch. Although less versatile than storage screen 26, storage screen 26*a* does not have any of its interstices partially blocked by a second screen thereby increasing the resolution available from a screen of this type.

Figure 4:
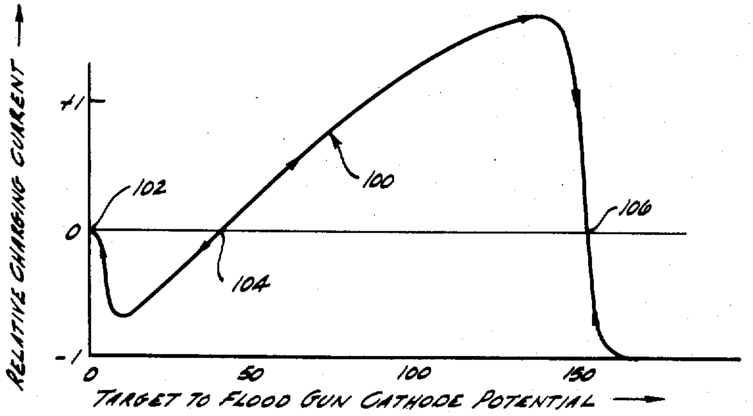
Figs. 4 and 5 are graphs illustrating characteristics of the storage screen of the device of Fig. 1.

To understand more clearly the operation of the direct-viewing half-tone storage device of the present invention reference is made to Fig. 4 which illustrates the secondary electron emission characteristic 100 of the storage screen 26 due to the incidence of the flood electrons over its storage surface. This secondary electron emission characteristic constitutes the relative charging current to a target area per unit of flood electron current incident thereon versus the potential difference between the target area on the storage surface and the flood gun cathode 50. The potential difference between the target area and the cathode 50 determines the velocity at which the electrons are incident on the storage surface. As shown in the Fig. 4 at a point 102, the current to the target area for zero velocity is zero and for a comparatively small increase in velocity goes sharply negative. At about 10 volts velocity, true secondary electron emission commences which progressively decreases the charging current until at a point 104, where the velocity is approximately equivalent to 40 volts, the current is again zero. This voltage which characterizes zero charging current at this point is generally designated as the "critical potential" of the storage surface and the concomitant electron velocity the "critical velocity." As the velocity of the electrons impinge on the storage surface at velocities greater than the critical velocity, more secondary electrons are attracted away from the target area than flood electrons incident thereon to progressively increase the charging current in a positive direction. As the potential of the collector grid 28 is approached, the secondary electrons can no longer be attracted away from the storage surface thus causing the charging current to rapidly decrease until at a point 106 it is again equal to zero. The charging current to the target area will obviously be negative when the target area is at a potential more positive than the potential corresponding to point 106. Thus it is apparent that the flood electrons will charge target areas having potentials less than the critical potential to the potential of the flood gun cathode 50, that is, to zero volts and target areas having potentials more than the critical potential to the potential corresponding to point 106.

In the operation of the device of the present invention, the storage surface is first made 30 volts positive with respect to ground by the application of the potential from battery 84 on nickel screen 76. In that this potential is less than the critical potential of the storage surface, the flood electrons will charge the storage surface to the potential of flood gun cathode 50, that is, to ground potential in accordance with characteristic 100 of Fig. 4. During this charging process the pulse generator 16 may periodically raise the potential of the storage surface above the critical potential. These intervals during which the storage surface is positive with respect to the critical potential, however, are sufficiently short so as not to allow the storage surface to be charged to the stable potential corresponding to point 106. Also, in accordance with this invention, the more positive areas of the storage surface are raised to a potential where optimum discharging occurs so that they are discharged within a period of time comparable to that of the less positive areas.

Figure 5:
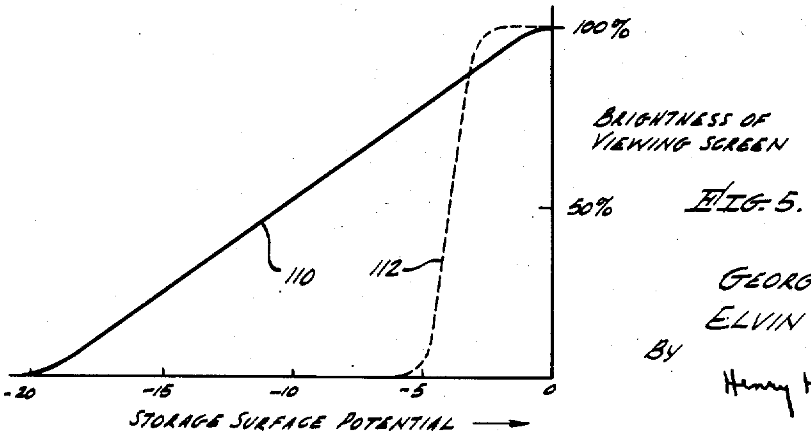

The magnitude of the pulses 107 generated by pulse generator 16 and shown schematically in Fig. 1 is approximately equal to the range of potentials over which half-tone operation takes place. This range may be adjusted to a limited extent by varying potential source 86. A representative half-tone range provided by storage screen 26 or 26*a* of the device of the present invention is illustrated by line 110 of Fig. 5 where the brightness of the viewing screen is plotted as a function of the storage surface potential. Referring to this figure it is seen that the brightness on the viewing screen 24 increases from 0 to 100% brightness as the charge on the screen surface increases from −20 volts to zero relative to the flood gun cathode 50. Dashed line 112 shows the effect of an un-neutralized charge on the storage surface. In a typical instance, an increase of less than 3 volts on the storage surface having un-neutralized charges would cause the brightness on the viewing screen to vary from 0 to 100%.

Thus in accordance with the characteristics of storage screens 26 and 26*a*, the pulse generator 16 periodically generates pulses of 20 volt magnitude across the resistor 82. These pulses may be single pulses at comparatively long intervals capable of completely erasing the storage surface. However, it is generally desirable that the repetition rate of these pulses be faster than the flicker rate that can be detected by the eye so that the periodic surges of flood electrons allowed to penetrate through the storage screen to the viewing screen do not produce visible changes in the brightness of the image. Also, the actual duration of a pulse may be of the order of 3% of the interval between pulses so that the flood electrons penetrating through the storage screen 26 during the intervals that the screen 26 is pulsed positive with respect to the flood gun cathode 50 do not substantially decrease the contrast of the visual image. However, if the decrease in contrast is too undesirable, the energy of the flood electrons may be decreased so as not to generate light during these intervals.

The effect of pulsing the storage screen 26 positive by a predetermined voltage is to raise the potential of the storage surface positive by an amount equal to the predetermined voltage. In accordance with the charging characteristic 100 of Fig. 4, the storage surface is charged over numerous successive pulses to a quiescent potential that is negative with respect to the potential of flood gun cathode 50 by an amount equal to the predetermined voltage. The device of the present invention is preferably operated with this predetermined voltage equal to the range of potentials over which half-tones are reproduced. Thus when the storage surface is charged to the aforementioned quiescent potential it is completely "erased."

Writing on the storage screen 26 is effected by bombarding the storage surface with an intensity-modulated electron beam from electron gun 30 to produce proportionate numbers of secondary electrons in accordance with the intelligence signal which are collected for the most part by collector grid 28. The intensity of the electron beam produced by electron gun 30 is adjusted by means of variable potential source 46 so that the storage surface is charged from the quiescent potential to a potential less than or below that of the flood gun cathode 50. During this phase of operation, the electron beam is scanned over the storage screen 26 in synchronism with the signal impressed on intensity electrode 40 by deflection voltages impressed on horizontal and vertical deflection plates 32, 34.

Figure 6:
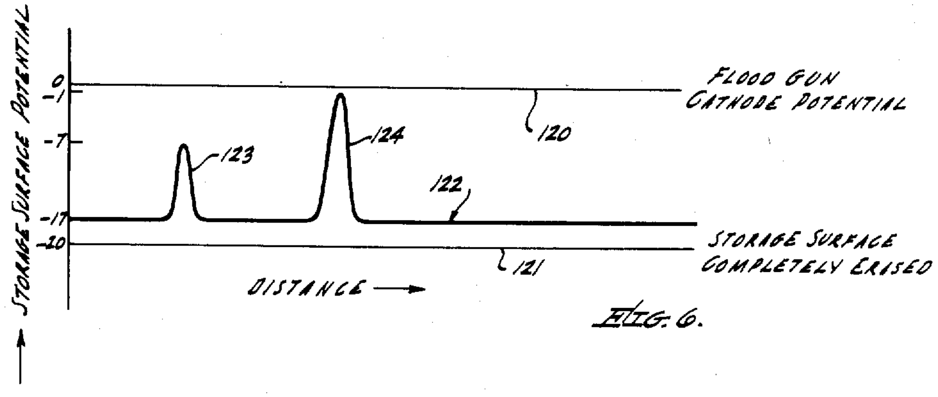
Figs. 6 and 7 are graphs explanatory of the operation of the device of Fig. 1.

A charge pattern of a typical radar display showing storage surface potential versus distance is shown in Fig. 6. Referring to this figure, line 120 represents the potential of floor gun cathode 50 and line 121 represents the quiescent potential to which the storage surface is initially charged. Line 122 represents the potential to which the storage surface is charged by the intensity modulated electron beam produced by electron gun 30 where the pip 123 represents a half-tone signal and the pip 124 represents the full-tone signal. For illustrative purposes, pips 123 and 124 may constitute areas on the storage surface charged 13 and 19 volts positive, respectively, with respect to the quiescent potential line 121. Under normal operation of a direct-viewing storage tube of this type, the charges constituting pips 123 and 124 would be discharged by ions in approximately 30 seconds which is a sufficient duration for most television and radar applications. Further, it is evident that for most applications it is necessary to have a controlled erasure of the charge pattern.

It is apparent in the present case that when the storage screen 26 is pulsed positive by 20 volts, the flood electrons commence to discharge the entire charge pattern represented by line 122 in accordance with the charging current characteristic shown in Fig. 4. For example, the pips 123 and 124 would be raised, respectively, to +13 and +19 volts positive with respect to ground which would allow the flood electrons to be incident thereon. Discharging the storage surface in this manner results in the half-tone pip 123 being discharged long before the full-tone pip 124. This, of course, is undesirable for most applications.

Figure 7:
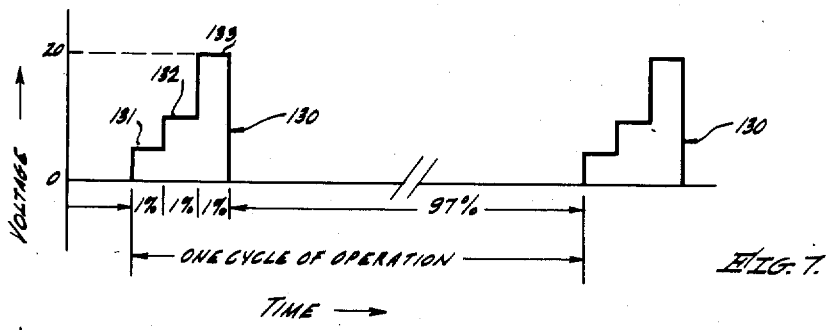

In accordance with the present invention, the storage screen 26 is pulsed positive by varying amounts to control the relative rate of discharge of the half-tone charges. To illustrate the controlled discharge of the half-tone pulses more clearly, reference is made to Fig. 7 wherein step discharge pulses 130 developed by pulse generator 16 are shown for explanatory purposes. One of the pulses 130 occupies 3% of a total period and constitutes, for example, a portion 131 having a magnitude of 5 volts, a portion 132 having a magnitude of 10 volts, and a portion 133 having a magnitude of 20 volts, the sequence of these portions being realtively unimportant. When impressed on the storage screen 26 at a time when the storage surface has a charge pattern such as, for example, the pattern 122 of Fig. 6, the portion 131 of pulses 130 will raise the pips 123, 124 by 5 volts to −2 and +4 volts, respectively. In that the pip 124 is now +4 volts positive with respect to the flood gun cathode 50, the flood electrons will commence to slowly discharge it in accordance with the corresponding charging current shown by characteristic 100 of Fig. 4. As the pip 123 is still −2 volts negative with respect to the floor gun cathode 50, it will be unaffected by the flood electrons during portion 131 of the pulses 130.

Assuming that any one of the pulses 130 will only discharge the pips 123, 124 by a negligible amount, the portion 132 of the pulses 130 will raise the pips 123, 124 to +3 and +9 volts, respectively. Thus during the portion 132, the half-tone pip 123 will be slowly discharged and the pip 124 will rapidly discharge as indicated by the characteristic of Fig. 4. During the remaining portion 133 of pulses 130, the entire charge pattern 122 is raised to potentials that are positive with respect to the flood gun cathode 50 thus enabling the flood electrons to commence discharging the entire storage surface during these intervals of time.

Figure 8:
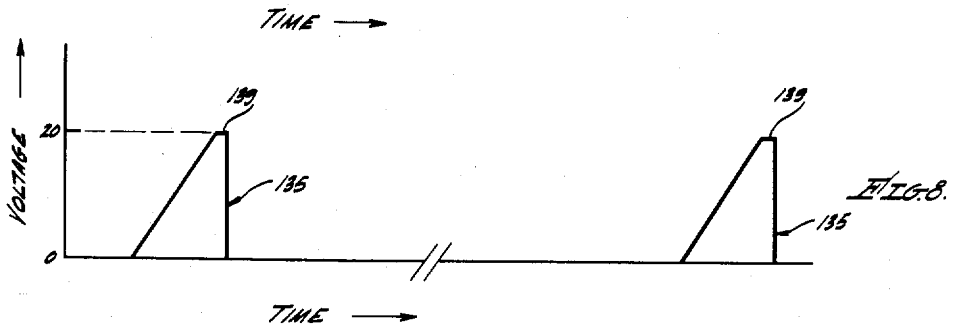
Figs. 8 and 9 are graphs showing representative waveforms generated by the pulse generator of Fig. 1.
Figure 9:
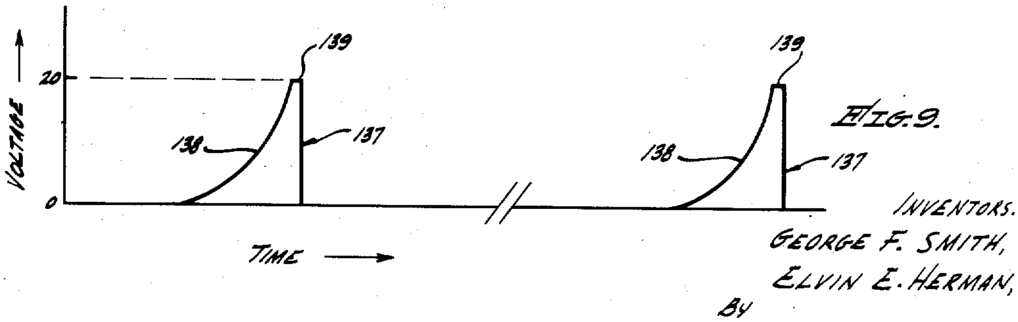

In the operation of the device of the present invention, the actual shape of the pulses employed depends somewhat on the charging characteristic of the storage screen together with its control over the flow of flood electrons to the viewing screen. In general, it is desirable to employ a pulse shape that maintains the comparative magnitudes of various potentials constituting a charge pattern in their relative proportions and discharges all portions of the charge pattern in the same length of time. This is achieved by varying the relative magnitudes of the various potentials constituting the pulses 130. In operation, it evident that the pulse generator 16 may approximate the pulses 130 by triangularly-shaped pulses 135 shown in Fig. 8 or pulses 137 having leading edges as shown in Fig. 9 provided, for example, by a conventional exponential charging circuit. Both pulses 135, 137 may be made to have flat portions 139 on top corresponding to 20 volts by impressing oversized pulses on a conventional limiting network.

What is claimed is:

1. In a direct-viewing storage tube, a storage screen assembly comprising a conductive screen having meshes and a predetermined thickness, a layer of secondary electron emissive dielectric material disposed over at least a portion of each elemental area on one side of said conductive screen coextensive with the meshes thereof to provide a storage surface adapted to store a charge pattern, said layer being of a uniform thickness that is substantially less than said predetermined thickness, whereby potentials provided on said storage surface constituting said charge pattern produce corresponding electrostatic fields within the respective interstices of said conductive screen, and means disposed in a plane substantially coincident with said storage surface for partially neutralizing said electrostatic fields.

2. In a direct-viewing storage tube, the storage screen as defined in claim 1 wherein said uniform thickness is less than 50,000 Angstroms.

3. In a direct-viewing storage tube, a storage screen assembly comprising a conductive screen having meshes and a predetermined thickness, a plurality of patches of secondary electron emissive dielectric material disposed over a portion of each elemental area on one side of said conductive screen coextensive with the meshes thereof, said patches being of a uniform thickness that is substantially less than said predetermined thickness, and means for maintaining the potential of the remaining portion of each elemental area on said one side of said conductive screen in a plane substantially coincident with the surface of said patches substantially equal to the potential of said conductive screen.

4. In a direct-viewing storage tube, a storage screen assembly comprising a metallic screen having meshes and a predetermined thickness, and a plurality of patches of secondary electron emissive dielectric material disposed over only a portion of each elemental area on one side of said metallic screen coextensive with the meshes thereof, said patches being of a uniform thickness that is substantially less than said predetermined thickness.

5. In a direct-viewing storage tube, a storage screen assembly comprising a first metallic screen having meshes and a predetermined thickness, a layer of secondary electron emissive dielectric material disposed over one side of said metallic screen coextensive with the meshes thereof, said layer being of a uniform thickness that is substantially less than said predetermined thickness, and a second metallic screen disposed in contact with said layer, said second metallic screen having a thickness of the same order of magnitude as said uniform thickness.

6. A direct-viewing half-tone storage device comprising a metallic screen having meshes and a predetermined thickness, a layer of secondary electron emissive dielectric material disposed over at least a portion of each elemental area on one side of said metallic screen coextensive with the meshes thereof to provide a storage surface, said layer being of a uniform thickness that is substantially less than said predetermined thickness, means for producing a charge pattern corresponding to intelligence signals on said storage surface, whereby the potentials constituting said charge pattern produce corresponding electrostatic fields within the respective interstices of said metallic screen, a viewing screen disposed adjacent to and coextensive with said metallic screen on the other side thereof, a source of flood electrons having a predetermined potential level and including means for directing the flood electrons uniformly over said metallic screen, said predetermined level being normally positive with respect to the potentials constituting said charge pattern, and means disposed in a plane substantially coincident with said storage surface for partially neutralizing said electrostatic fields, thereby enabling said flood electrons to penetrate through said respective interstices to said viewing screen to produce a half-tone replica of said charge pattern.

7. The direct-viewing half-tone storage device as defined in claim 6 including means for periodically impressing voltage pulses on said metallic screen to make the potentials constituting said charge pattern more positive relative to said predetermined potential level, each of said voltage pulses having potentials of predetermined different magnitudes to control the relative persistence of the elemental areas constituting said half-tone replica.

8. The direct-viewing half-tone storage device as defined in claim 7 wherein the waveform of said voltage pulses provides a linearly increasing potential over a finite period of time.

9. The direct-viewing half-tone storage device as defined in claim 7 wherein the waveform of said voltage pulses provides an exponentially increasing potential over a finite period of time.

10. A direct-viewing half-tone storage device comprising a first metallic screen having meshes and a predetermined thickness, a layer of secondary electron emissive dielectric material disposed over one side of said first metallic screen coextensive with the meshes thereof to provide a storage surface, said layer being of a uniform thickness that is substantially less than said predetermined thickness, means for producing a charge pattern corresponding to intelligence signals on said storage surface, whereby the potentials constituting said charge pattern produce corresponding electrostatic fields within the respective interstices of said first metallic screen, a viewing screen disposed adjacent to said first metallic screen on the other side thereof, a source of flood electrons having a predetermined potential level and including means for directing the flood electrons uniformly over said first metallic screen, said predetermined potential level being normally positive with respect to the potentials constituting said charge pattern, a second metallic screen disposed in contact with said storage surface having a thickness of the same order of magnitude as said uniform thickness, and means for maintaining said second metallic screen at a potential to partially neutralize said electrostatic fields thereby enabling said flood electrons to penetrate through said respective interstices to said viewing screen to produce a half-tone replica of said charge pattern.

11. A direct-viewing half-tone storage device comprising a metallic screen having meshes and a predetermined thickness, a plurality of patches of secondary electron emissive dielectric material disposed over only a portion of each elemental area on one side of said metallic screen coextensive with the meshes thereof to provide a storage surface, said patches being of a uniform thickness that is substantially less than said predetermined thickness, means for producing a charge pattern corresponding to intelligence signals on said storage surface, a viewing screen disposed adjacent to and coextensive with said metallic screen on the other side thereof, a source of flood electrons having a predetermined potential level and including means for directing the flood electrons uniformly over said one side of said metallic screen, said predetermined potential level being normally positive with respect to the potentials constituting said charge pattern, whereby said flood electrons penetrate through the interstices of said metallic screen to said viewing screen to produce a half-tone replica of said charge pattern.

References Cited in the file of this patent

UNITED STATES PATENTS

| | | |
|---|---|---|
| 2,186,393 | Ring | Jan. 9, 1940 |
| 2,532,339 | Schlesinger | Dec. 5, 1950 |